United States Patent
Friedmann

Patent Number: 5,295,910
Date of Patent: Mar. 22, 1994

[54] APPARATUS FOR DAMPING VIBRATIONS

[75] Inventor: Oswald Friedmann, Lichtenau, Fed. Rep. of Germany

[73] Assignee: Luk Lamellen und Kupplungsbau GmbH, Buhl, Fed. Rep. of Germany

[21] Appl. No.: 525,141

[22] Filed: May 17, 1990

[30] Foreign Application Priority Data

May 22, 1989 [DE] Fed. Rep. of Germany ....... 3916616

[51] Int. Cl.$^5$ ............................................. F16F 15/12
[52] U.S. Cl. ........................................ 464/63; 464/64; 464/67
[58] Field of Search .................. 464/63, 62, 64, 68, 464/66, 67; 74/574, 411; 192/106.2

[56] References Cited

U.S. PATENT DOCUMENTS

| | | | |
|---|---|---|---|
| 4,138,003 | 2/1979 | Malloy | 464/64 X |
| 4,611,701 | 9/1986 | Friedmann | 192/110 B |
| 4,668,207 | 5/1987 | Koshimo | 464/68 X |
| 4,739,866 | 4/1988 | Reik | 192/70.17 |
| 4,856,636 | 8/1989 | Meinhard | 464/68 X |
| 4,890,710 | 1/1990 | Reik | 192/70.17 |
| 4,904,225 | 2/1990 | Worner et al. | 192/106.2 X |
| 4,946,420 | 8/1990 | Jäckel | 464/68 X |
| 4,947,706 | 8/1990 | Umeyama et al. | 464/68 X |
| 4,987,980 | 1/1991 | Fujimoto | 464/64 X |

FOREIGN PATENT DOCUMENTS

2090372 7/1982 United Kingdom ................. 464/64

*Primary Examiner*—Daniel P. Stodola
*Attorney, Agent, or Firm*—Darby & Darby

[57] ABSTRACT

Apparatus for damping vibrations between an engine and a power train has two coaxial flywheels and at least one damper which operates between and opposes rotation of the flywheels relative to each other. The damper employs at least two arcuate coil springs which are adjacent each other in the axial direction of the flywheels and are disposed in a lubricant-containing annular chamber of the flywheel which receives torque from the engine. The springs are angularly offset relative to each other and react against stops which are provided in the chambered flywheel. Each spring bears against stops which are provided on a flange constituting the output element of the damper and serving to transmit torque to the other flywheel by way of a second damper.

41 Claims, 4 Drawing Sheets

APPARATUS FOR DAMPING VIBRATIONS

BACKGROUND OF THE INVENTION

The invention relates to vibration damping apparatus in general, and more particularly to improvements in vibration damping apparatus which can be utilized with advantage in or ahead of power trains between the engines and wheels of motor vehicles. Vibration damping apparatus of the type to which the present invention pertains are disclosed in numerous United States and foreign patents as well as in numerous pending United States and foreign patent applications of the assignee of the present application. Reference may be had, for example, to U.S. Pat. Nos. 4,611,701, 4,739,866 and 4,890,710.

Vibration damping apparatus which are installed between the output element of an engine and a power train in a motor vehicle normally comprise an input member (such as a first rotary flywheel which is driven by the crankshaft of the engine), an output member (such as a second flywheel which is connectable with the power train, e.g., by way of an engageable and disengageable friction clutch, and is coaxial with and rotatable relative to the first flywheel), and a damping device which operates between the input and output members. As a rule, the damping device comprises energy storing means including springs which yieldably oppose angular movements of the input and output members relative to each other.

OBJECTS OF THE INVENTION

An object of the invention is to provide a vibration damping apparatus which is capable of damping vibrations more effectively and more reliably than heretofore known apparatus.

Another object of the invention is to provide an apparatus wherein the damping characteristics of the damping device between the input and output members are or can be selected in such a way that the apparatus can effectively filter vibrations between the input and output members of different motor vehicles wherein the vibrations and/or the generation of noise vary within a wide range.

A further object of the invention is to provide an apparatus which is effective at high or low rotational speeds of the engine as well as at resonance speeds, during starting and during stoppage of the engine.

An additional object of the invention is to provide a vibration damping apparatus which permits substantial angular movements of the input and output members relative to each other.

Still another object of the invention is to provide an apparatus wherein the energy storing means of the damping device is not subjected, or need not be subjected, to pronounced stresses.

A further object of the invention is to provide a novel and improved method of assembling the components of the above outlined vibration damping apparatus in a simple and time-saving manner.

Another object of the invention is to provide a vibration damping apparatus the useful life of which is longer than that of heretofore known vibration damping apparatus and wherein the components are subjected to less wear than in heretofore known apparatus of the same character.

An additional object of the invention is to provide a novel and improved flywheel for use in the above outlined apparatus.

A further object of the invention is to provide an apparatus the parts of which can be mass-produced in available machines and which is less expensive than heretofore known apparatus.

Another object of the invention is to provide a novel and improved combination of springs and stops for use in the above outlined vibration damping apparatus.

SUMMARY OF THE INVENTION

The improved apparatus can be utilized as a means for damping vibrations between an engine and a power train. In accordance with a presently preferred embodiment of the invention, the vibration damping apparatus comprises a plurality of flywheels including a first flywheel having an annular chamber and being connectable with the engine, and a second flywheel which is rotatable relative to the first flywheel and is connectable with the power train, preferably by way of a clutch (such as an engageable and disengageable friction clutch). The apparatus further comprises a damping device which operates between the first and second flywheels and includes energy storing means provided in the chamber, and an output element serving to transmit torque to the second flywheel. The energy storing means reacts against the first flywheel and bears against the output element, and the output element extends into the chamber substantially radially of the first flywheel. The energy storing means comprises at least one first and at least one second spring, and the springs are adjacent each other in the axial direction of the first flywheel and are angularly offset relative to each other in the circumferential direction of the first flywheel. The output element can comprise a one-piece flange. The first flywheel has first stops and the output element has second stops for the springs. The springs react against the first stops and bear against the second stops. The stops for the at least one first spring are angularly offset with reference to the stops for the at least one second spring in the circumferential direction of the first flywheel.

The energy storing means can include a set of first springs and a set of second springs, and each set can comprise fewer than five springs, i.e., between two and four springs.

The angular offset of the at least one first spring and the at least one second spring can be such that stressing of the springs as a result of angular displacement of the first and second flywheels does not entail unbalancing of the apparatus.

The first and second springs are or can be disposed substantially at the same radial distance from the axis of the first flywheel.

The energy storing means can extend along an arc of at least close to 360° in the circumferential direction of the first flywheel. For example, the energy storing means can extend along an arc of between 70 percent (approximately 252°) and 97 percent (approximately 346°) of the circumference of the first flywheel.

The output element can constitute or comprise a one-piece flange having a periphery provided with the aforementioned second stops for the springs. The stops of the flange can extend in substantial parallelism with the axis of the first flywheel and include at least one first stop element for the at least one first spring and at least one second stop element for the at least one second spring. The arrangement may be such that the at least one first stop element extends in a first direction (e.g., away from the second flywheel) and that the at least one second stop element extends in a second direction (toward the second flywheel) counter to the first direction. The flange can comprise at least two first stop elements, and the at least one second stop element is then located between the at least two first stop elements as seen in the circumferential direction of the first flywheel.

The energy storing means can comprise a single first spring and a single second spring. Each first stop is then disposed substantially diametrically opposite the respective second stop.

The first flywheel can comprise two substantially dished sections which define the annular chamber. The first stops are provided on the sections of the first flywheel. Such first stops can include pockets for portions of the respective springs. Alternatively, or in addition to the pockets, the first stops can include projections which are secured to the sections of the first flywheel. Each projection can comprise a first portion which extends radially of the first flywheel and at least one second portion extending circumferentially of the first flywheel. The springs react against the radially extending first portions of the respective projections. The circumferentially extending second portion of each projection is preferably adjacent one of the springs and constitutes an abutment which holds the corresponding spring against movement relative to the first flywheel in at least one of the two directions radially inwardly and outwardly of the first flywheel. The first flywheel can comprise means (e.g., in the form of welded seams) for bonding the projections to the respective sections of the first flywheel.

The first flywheel can include a group of first stops and the output element can comprise a group of second stops. The stops of one of the groups have recesses extending in the circumferential direction of the first flywheel, and each stop of the other group preferably extends into one of the recesses. The recesses can be provided in the first stops, and each such first stop then preferably comprises a first portion and a second portion disposed outwardly of the respective first portion as seen in the radial direction of the first flywheel. The recesses are disposed between the first and second portions of the respective first stops. As mentioned above, the second stops can extend in substantial parallelism with the axis of the first flywheel. The first portion of each first stop can include a projection which is secured to the first flywheel, and the second portion of each first stop can include a pocket for a portion of the respective spring.

The apparatus can further include a first wear-resistant insert for the at least one first spring and a second wear-resistant insert for the at least one second spring. The inserts can resemble arcuate troughs and are disposed in the chamber substantially radially outwardly of the respective springs. Such apparatus can further comprise at least one mounting member for the inserts, and the at least one mounting member can comprise a ring (e.g., a split ring) which is installed in the chamber between the two inserts. The first flywheel can be provided with a groove machined into or otherwise formed in an internal surface which surrounds the chamber, and a portion of the ring then extends into such groove. The ring can have a substantially circular cross-sectional outline.

Each section of the first flywheel can be provided with a groove extending circumferentially of the first flywheel and forming part of the chamber. The springs extend into the grooves and those surfaces of the two sections which bound the grooves preferably conform (at least substantially) to the outlines of the respective springs. Each spring can constitute a coil spring. The grooves are preferably defined by arcuate portions (e.g., arcuate stampings) of the respective sections.

The damping device can further comprise additional energy storing means disposed radially inwardly of the springs. Such additional energy storing means can be located substantially midway between the first and second springs, as seen in the axial direction of the first flywheel. The additional energy storing means can comprise at least one additional spring (e.g., at least one additional coil spring). The second stops define compartments which extend substantially circumferentially of the first flywheel and receive portions of the first and second springs, and the output element can be provided with a window for the at least one additional spring. The first and second springs preferably operate in series with the spring or springs of the additional energy storing means.

The damping device can further comprise two discs or walls which flank the output element and serve to transmit torque from the output element to the second flywheel. The discs have means for receiving portions of the additional energy storing means so that the latter can transmit torque from the output element to the discs. The output element comprises means for connecting the first and second springs in series with the spring or springs of the additional energy storing means. The receiving means can include stampings or like parts which engage the additional energy storing means, and such stampings can form integral parts of the discs or walls.

The at least one first spring can operate in parallel with the at least one second spring.

The damping device can further comprise friction generating means between the first and second flywheels. The friction generating means can be designed in such a way that it opposes certain angular movements of the first and second flywheels relative to each other. The friction generating means can be disposed between the axis of the first flywheel and the aforementioned discs or walls, i.e., radially inwardly of the discs. The output element can be provided with at least one slot, and the friction generating means can comprise an extension which is received in the at least one slot with at least some play in the circumferential direction of the first flywheel.

Antifriction bearing means (e.g., a ball or roller or needle bearing having at least one annulus of rolling elements) is preferably installed between the first and second flywheels.

Another feature of the invention resides in the provision of an apparatus for damping vibrations in or upstream of power trains of motor vehicles. The apparatus comprises a rotary input member (such as the aforementioned first flywheel), a rotary output member (such as the aforementioned second flywheel), and energy storing means operating between and extending in the circumferential direction of the input and output members. The energy storing means includes at least one first spring and at least one second spring. The first and second springs are adjacent each other in the axial direction of the input and output members and are offset relative to each other in the circumferential direction of the input and output members. The springs react against one of the members and bear against the other member. Such apparatus preferably further comprises first stops provided for the springs on the input member and second stops provided for the springs on the output member. The springs react against the respective first stops and bear against the respective second stops.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF PREFERRED EMBODIMENTS

Figure 1:
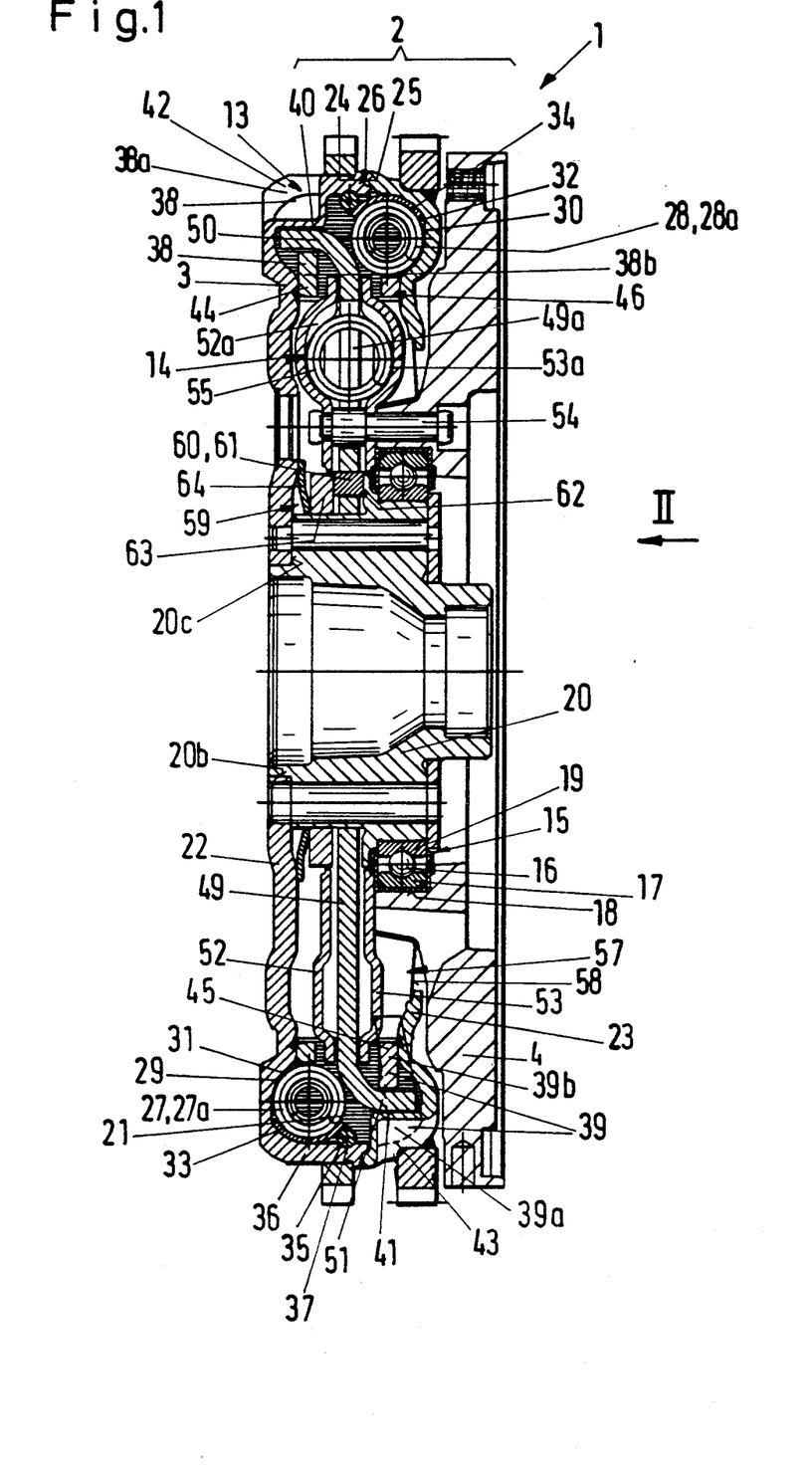
FIG. 1 is an axial sectional view of a vibration damping apparatus which embodies one form of the invention.
Figure 2:
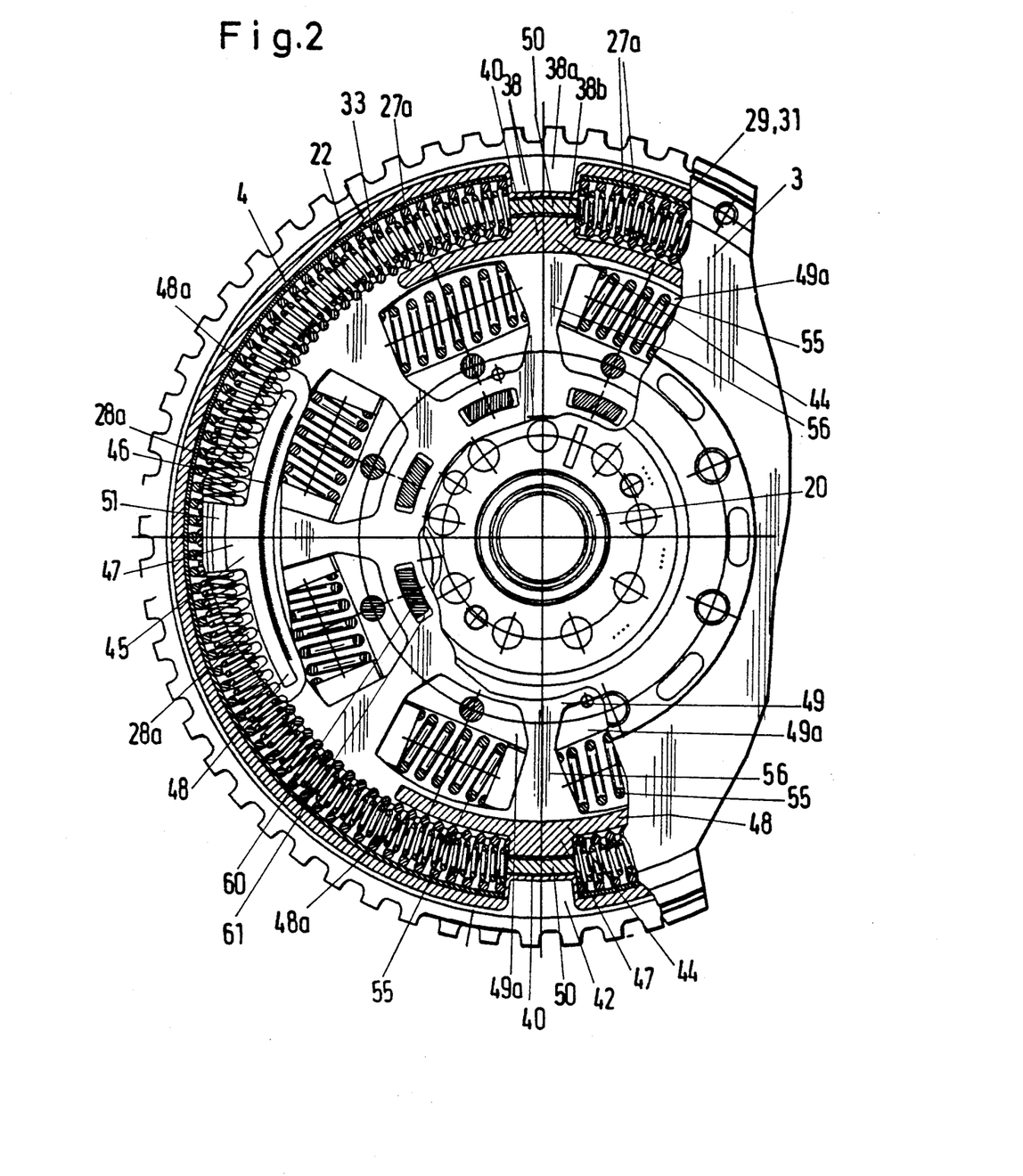
FIG. 2 is a fragmentary view as seen in the direction of arrow II in FIG. 1, with certain portions of the apparatus broken away.

Referring first to FIGS. 1 and 2, there is shown a vibration damping apparatus 1 serving to damp vibrations which the output element (e.g., a crankshaft) of an engine tends to transmit to the power train in a motor vehicle. Reference may be had to the aforementioned U.S. Pat. Nos. 4,611,701 and 4,890,710 which show an engine and its crankshaft as well as a variable-speed transmission which can be said to form part of the power train and receives torque by way of an engageable and disengageable friction clutch. The apparatus 1 comprises a composite flywheel 2 including a first rotary flywheel 3 which can be said to constitute the input member of the apparatus, and a second flywheel 4 which is coaxial with the flywheel 3 and can be said to constitute the output member of the apparatus. The first flywheel or input member 3 is connectable (e.g., by means of bolts or bolts and nuts) to the output element of the engine, and the second flywheel or output member 4 is connectable with the power train, e.g., by means of the aforementioned engageable and disengageable friction clutch. The friction clutch has a clutch plate which is mounted on the input shaft of the variable-speed transmission in the power train and receives torque from the flywheel 4 when the clutch is engaged.

The apparatus 1 further comprises a damping device which, in the embodiment of FIGS. 1 and 2, comprises a first damper 13, a second damper 14 and a friction generating device 59. The dampers 13 and 14 are installed to operate in series and permit rather pronounced angular movements of the flywheels 3, 4 relative to each other.

An antifriction bearing 15, here shown as including a ball bearing 16 with a single annulus of spherical rolling elements, is installed between a cylindrical axial protuberance 20 of the first flywheel 3 and within an axial recess 18 of the flywheel 4. The outer race 17 of the bearing 16 is disposed in the recess 18, and the inner race 19 of this bearing is a press-fit on the adjacent portion of the external surface of the protuberance 20. A disc-shaped retainer is used to hold the inner race 19 against axial movement off the protuberance 20 of the flywheel 3.

The flywheel 3 can be said to constitute a housing or casing and includes two dished sections 22, 23 which define an annular chamber 21 for the dampers 13 and 14. The sections 22, 23 are made of metallic sheet material and include abutting annular rims 24, 25 located radially outwardly of the chamber 21. The rims 24, 25 are bonded (e.g., welded, as at 26) to each other to fluid-tightly seal the radially outermost portion of the chamber 21.

The damper 13 is installed in the chamber 21 radially outwardly of the damper 14 and includes energy storing means composed of two sets 27, 28 of coil springs 27a, 28a. The springs 27a of the set 27 are adjacent the springs 28a of the set 28 in the axial direction of the flywheel 3 and are disposed at the same distance or close to the same distance from the common axis of the flywheels 3, 4 and ball bearing 16. The set 27 comprises two coil springs 27a, and the set 28 comprises two coil springs 28a. The springs 27a are offset with reference to the springs 28a in the circumferential direction of the flywheel 3. Each spring 27a of the illustrated set 27 consists of two coil springs one of which is telescoped into the other. The same holds true for each spring 28a of the set 28. The angular offset of springs 27a relative to the springs 28a is approximately 90°. FIG. 2 shows that each spring 27a extends along an arc of nearly 180°. Each spring 28a also extends along an arc of nearly 180°; however, and as mentioned above, each spring 28a is angularly offset with reference to the adjacent spring 27a by 90°.

Those sides of the sections 22, 23 which face the chamber 21 are provided with arcuate grooves 29, 30 which form part of the chamber 21 and receive portions of the respective springs 27a, 28a. Those arcuate portions of the sections 22, 23 which define the respective grooves 29, 30 are denoted by reference characters 31, 32. The arcuate portions 31, 32 are adjacent the rims 24, 25 of the respective sections 22, 23. The configuration of surfaces bounding the grooves 29, 30 is preferably such that it closely conforms to the outlines of adjacent portions of the respective springs 27a and 28a; this ensures that the arcuate shape of the springs 27a, 28a conforms to arcuate shape of the respective grooves 29, 30. Thus, the internal surfaces of the portions 31, 32 can be called abutments and/or guide means for adjacent portions of the arcuate coil springs 27a, 28a. In the absence of arcuate wear-resistant inserts 33, 34, the surfaces bounding the grooves 29, 30 constitute the only means for limiting the extent of radially outward movement of springs 27a, 28a under the action of centrifugal force when the flywheel 3 is driven by the engine in a motor vehicle and the springs 27a, 28a of the energy storing means 27+28 serve to transmit torque between the flywheels 3 and 4.

The aforementioned wear-resistant inserts 33, 34 can be made of high-quality steel or other strongly wear-resistant material and resemble arcuate troughs which are installed in the respective grooves 29, 30 to serve as abutments for radially outer portions of the springs 27a, 28a when the engine drives the flywheel 3. The internal surfaces of the inserts 33, 34 closely follow the outlines of adjacent portions of the respective springs 27a, 28a, and these inserts are held in proper positions, within the chamber 21 by a mounting member 35 in the form of a split ring having a circular cross-sectional outline and being partially recessed into a groove 37 provided in the adjacent axially extending portion 36 of the flywheel 3, namely in a portion which includes the rim 24 and has an internal surface radially outwardly adjacent the chamber 21. The groove 37 is machined into or is otherwise formed in such internal surface of the portion 36. The inserts 33, 34 prevent the springs 27a, 28a from causing pronounced wear upon the sections 22, 23 of the flywheel 3. The ring 35 is disposed between the inserts 33, 34 (as seen in the axial direction of the flywheels 3 and 4), and its purpose is to facilitate rapid insertion and proper positioning of the inserts 33, 34 in the chamber 21 with reference to the sections 22, 23 and hence with reference to the springs 27a and 28a.

The springs 27a, 28a react against stops 38, 39 which are provided on the sections 22, 23, respectively. Each of the stops 38, 39 comprises two portions 38a, 38b and 39a, 39b. The portions 38a, 38b are disposed at different radial distances from the axis of the flywheel 3, the same as the portions 39a, 39b, and the portions 38a, 38b are offset with reference to the portions 39a, 39b in the circumferential direction of the flywheel 3. The portions 38a, 38b are separated from each other by radial recesses 40, and the portions 39a, 39b are separated from each other by radial recesses 41. The radially outer portions 38a, 39a resemble or constitute pockets (numbered 42, 43) for portions of the respective springs 27a, 28a, these pockets being provided in the respective sections 22, 23 of the flywheel 3. The radially inner portions 38b, 39b of the stops 38, 39 can constitute separately produced projections (numbered 44, 45) which are preferably permanently connected (e.g., welded) to the respective sections 22, 23 (as by welded seams 46).

As can be seen in FIG. 2, each of the projections 44, 45 comprises a radially extending tongue-like first portion 47 which constitutes the actual stop for the respective spring 27a, 28a, and a circumferentially extending second portion 48, 48a which is disposed radially inwardly of the adjacent spring 27a or 28a and prevents radial movements of the respective spring toward the axis of the flywheel 3. Thus, the springs 27a, 28a are confined between the inserts 33, 33 on the one hand and the circumferentially portions 48, 48a on the other hand. The tongue-like portions 47 extend radially between neighboring springs 27a and 28a, i.e., they are disposed between such springs as seen in the axial direction of the flywheel 3. The provision of circumferentially extending second portions 48, 48a of the projections 44, 45 contributes significantly to convenience and simplicity of installing and retaining the springs 27a, 28a in the respective grooves 29, 30 during assembly of the damper 13 with the flywheel 3.

The radially outer portions 38a, 39a of the stops 38, 39 can constitute separately produced parts which are non-rotatably connected to the respective sections 22, 23 of the flywheel 3 by welding or in any other suitable way.

The output element of the damper 13 is a one-piece flange 49 which extends radially outwardly into the chamber 21 between the sections 22, 23 of the flywheel 3 and serves to transmit torque from the flywheel 3 to the flywheel 4 while receiving torque from the flywheel 3 by way of the springs 27a, 28a. The radially outermost portion of the output element 49 (hereinafter called flange for short) has a set of stop elements 50, 51 for the springs 27a and 28a. These springs react against the respective stops 38, 39 and bear against the respective stop elements 50, 51 when the apparatus 1 operates in such a way that the flywheel 3 is driven by the output element of the engine and transmits torque to the flywheel 4 by way of the energy storing means 27+28 and flange 49. As can be seen in FIG. 1, the stop elements 50 are integral prongs of the flange 49 and extend in parallelism with the axis of the flywheel 3 in a direction away from the flywheel 4. The stop elements 51 are prongs which are parallel to the axis of the flywheel 3 and extend toward the flywheel 4. The prongs or stop elements 50 extend into the recesses 40 and the prongs or stop elements 51 extend into the recesses 41. As can be seen in FIG. 2, the length of stop elements 50, 51 (in the circumferential direction of the flywheel 3) is the same as that of the stops 38, 39 on the sections 22, 23. The arrangement is such that the stop elements 50 alternate with stop elements 51 in the circumferential direction of the flywheel 3, i.e., each stop element 50 is flanked by two stop elements 51 and each stop element 51 is flanked by two stop elements 50. The angular distance between neighboring stop elements 50, 51 (in the circumferential direction of the flywheel 3) is approximately 90°. This is the reason for the aforediscussed angular staggering of the springs 27a and 28a by 90°.

The flange 49 constitutes the output element of the damper 13 as well as the input element of the damper 14. The output element of the damper 14 includes two concentric discs 52, 53 which flank the flange 49 and are affixed to the flywheel 4 by distancing elements 54 in the form of rivets or bolts extending with circumferential play through the flange 49 and being anchored in the flywheel 4. The distancing elements 54 establish rigid connections between the discs 52, 53 as well as between these discs 52, 53 on the one hand and the flywheel 4 on the other hand. Each distancing element 54 is parallel or substantially parallel to the axis of the flywheel 4.

The inner damper 14 further comprises energy storing means including a group of coil springs 55 each of which extends in part into a discrete window 49a of the flange 49 and in part into suitably configured receiving means 52a, 53a of the discs 52, 53. Each of these receiving means preferably constitutes an integral stamping of the respective disc 52 or 53. Each of the stampings 52a, 53a can be said to constitute or resemble a pocket for a portion of the respective coil spring 55. As can be seen in FIG. 2, the springs 55 of the inner damper 14 are disposed at least approximately midway between the springs 27a, 28a of the outer damper 13, as seen in the axial direction of the flywheel 3. In other words, the plane including the axes of the springs 55 is located at least approximately midway between the plane including the axes of the springs 27a and the plane including the axes of the springs 28a.

The flange 49 has radially extending stops 56 which alternate with the windows 49a, and each coil spring 55 reacts against one of the stops 56. The springs 55 bear against suitably configured stops of the discs 52, 53, i.e., against the flywheel 4 which is non-rotatably connected to the discs 52, 53 by the distancing elements 54. The springs 55 of the damper 14 operate in series with the springs 27a, 28a of the damper 13 and serve to oppose rotation of the flange 49 and flywheel 4 relative to each other.

The apparatus 1 further comprises a sealing element 57 which is disposed radially inwardly of the section 23 and prevents uncontrolled escape of a viscous fluid from the chamber 21. This sealing element operates between the portion 32 of the section 23 and the flywheel 4. The illustrated sealing element 57 comprises a ring-shaped (washer-like) membrane 58 which is elastically deformable in the axial direction of the flywheels 3, 4 and has a radially outermost portion which is installed in prestressed condition and is sealingly secured to portion 32 of the section 23. The radially innermost portion of the membrane 58 is sealingly clamped between the disc 53 and the flywheel 4.

The protuberance 20 of the flywheel 3 has an external surface 20b which centers the section 22 of the flywheel 3. The section 22 abuts a radially extending circumferentially complete external shoulder 20c of the protuberance 20 so that it is held against axial movement toward the ball bearing 16. The connection between the protuberance 20 and the section 22 of the flywheel 3 can include mating threads, rivets, one or more welded seams, upset portions of the protuberance and/or section 22 and/or others.

The aforementioned friction generating device 59 of the damping device between the flywheels 3 and 4 is disposed between the axis of the flywheel 3 and the discs 52, 53, i.e., radially inwardly of the discs. This damping device comprises one or more block-shaped extensions 60 which are received (with freedom of movement in the circumferential direction of the flywheel 3) in slots 61 of the flange 49. The latter is centered by the protuberance 20 of the flywheel 49. The thickness of the extensions 60 (each of which can be said to constitute a friction generating shoe) in the axial direction of the flywheel 3 exceeds the thickness of the flange 49; each of these extensions abuts a radially extending shoulder 62 of the protuberance 20 under the action of a diaphragm spring 64 which reacts against the flywheel 3 and causes a pressure-transmitting ring 63 of the friction generating device 59 to bear against the extensions 60. The diaphragm spring 64 is installed in prestressed condition between the section 22 of the flywheel 3 and the pressure transmitting ring 63.

The viscous fluid which at least partially fills the chamber 21 is preferably a lubricant, particularly a lubricant in the form of grease. When the flywheel 3 is driven so that the viscous fluid gathers in the radially outermost portion of the chamber 21 under the action of centrifugal force, the fluid preferably fills the chamber at least to the level of the axes of the springs 27a, 28a, i.e., each of these springs dips into the supply of viscous fluid when the flywheel 3 is driven to transmit torque to the flywheel 4 via dampers 13 and 14. The arrangement may be such that the springs 27a and 28a are fully immersed in the supply of viscous fluid in the chamber 21 when the engine is on to drive the flywheel 3. This is indicated in FIG. 1 by horizontal lines denoting that the radially outer portion of the chamber 21 (namely the portion accommodating the springs 27a and 28a) is filled with viscous fluid.

Figure 3:
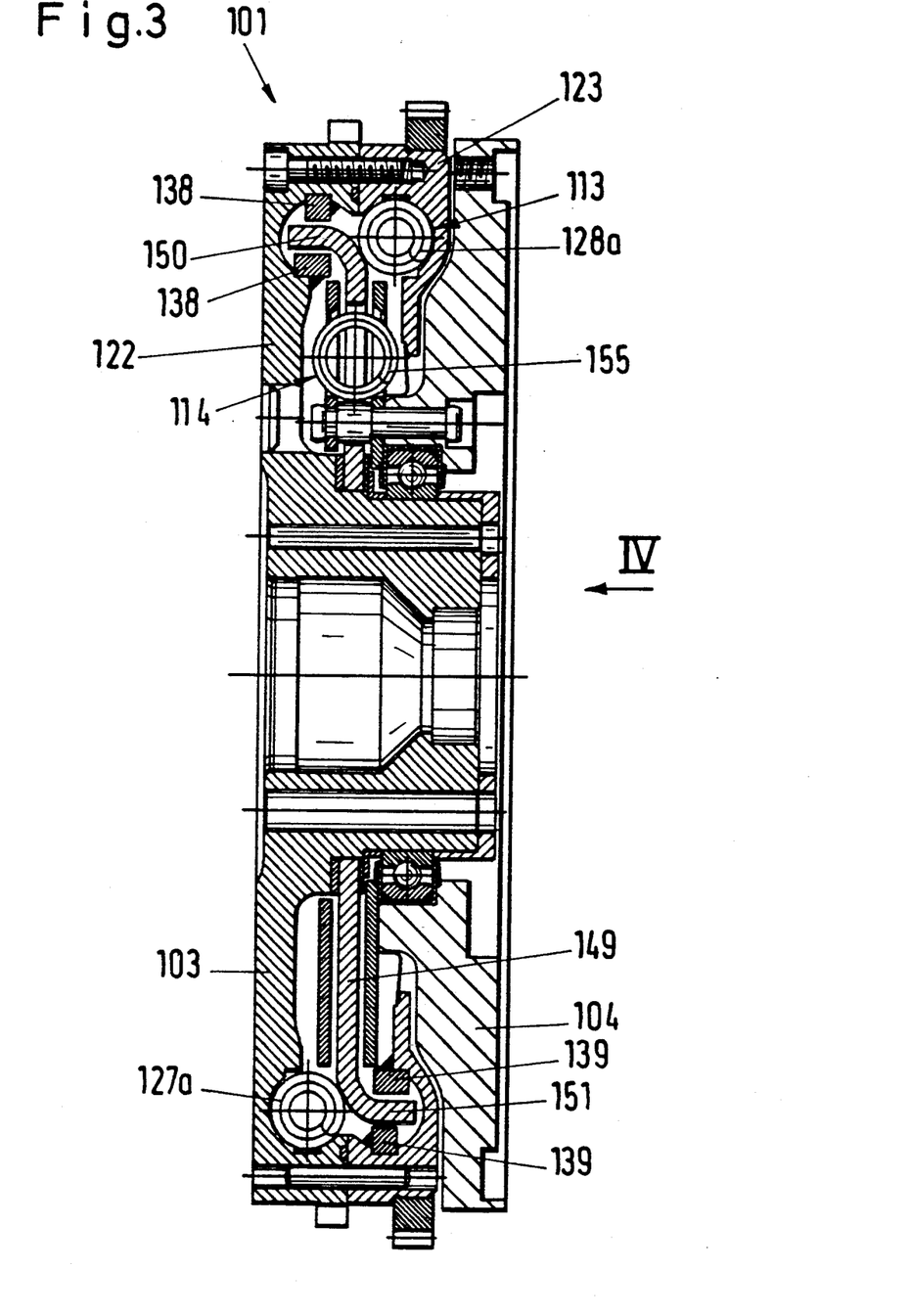
FIG. 3 is an axial sectional view of a modified vibration damping apparatus.
Figure 4:
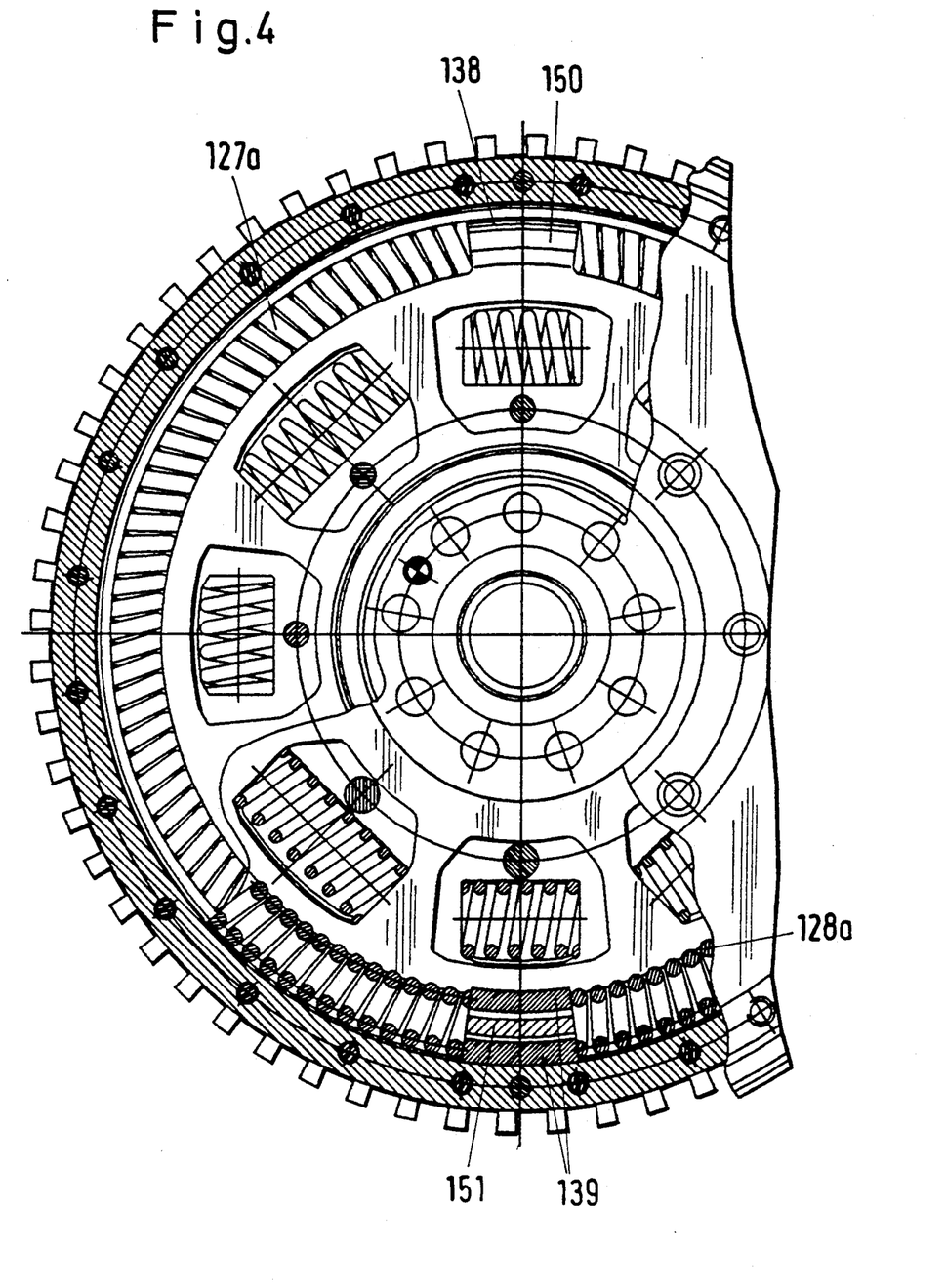
FIG. 4 is a fragmentary view as seen in the direction of arrow IV in FIG. 3, with certain parts of the apparatus broken away.

FIGS. 3 and 4 show a modified vibration damping apparatus 101. All such parts of this apparatus which are identical with or clearly analogous to corresponding parts of the apparatus 1 of FIGS. 1-2 are denoted by similar reference characters plus 100. The outer damper 113 of the apparatus 101 comprises a single coil spring 127a and a single coil spring 128a. These springs are adjacent each other in the axial direction of the flywheels 103, 104 and are angularly offset relative to each other in the circumferential direction of the flywheels. The sections 122, 123 of the flywheel 103 carry stops 138, 139 for the respective springs 127a, 128a, and the flange 149 has additional or second stops 150, 151. FIG. 4 shows that the stops 138, 150 are located diametrically opposite the stops 139, 151. Each of the springs 127a, 128a extends along an arc of nearly 360°, i.e., the apparatus 101 can employ very long coil springs which is desirable and advantageous because the flywheels 103, 104 are free to perform large angular movements relative to each other. Such long coil springs 127a, 128a ensure that their stressing (in response to angular movement of the flywheels 103, 104 relative to each other) does not cause any unbalance of the apparatus 101 when the flywheel 103 and/or 104 is driven to rotate the other flywheel by way of the dampers 113, 114.

The sections 122, 123 of the flywheel 103 are or can constitute castings.

The damper 114 is disposed radially inwardly of the damper 113 and is (or can be) identical with or analogous to the damper 13 of the apparatus 1. The dampers 113, 114 are designed to operate in series, and the springs 127a, 128a of the damper 113 operate in parallel.

An important advantage of the improved apparatus 1 and 101 is that they can transmit substantial torque as well as that each thereof can produce a pronounced damping action to thus prevent vibration of the flywheels 3, 4 or 103, 104 relative to each other.

Another important advantage of the improved apparatus is that they can employ relatively soft (low-rigidity) springs while permitting substantial deformation (shortening or lengthening) of each spring. The feature that the flywheels 3, 4 or 103, 104 are free to cover large angular distances relative to each other, coupled with the utilization of springs having a relatively low spring rate or damping ratio, renders it possible to damp or filter high-amplitude vibrations (i.e., relatively large alternating torques with pronounced peaks) as well as to damp low-amplitude vibrations (relatively small fluctuations of torque).

The apparatus 1 or 101 can operate satisfactorily with a single damper (13 or 113). However, the damping action is improved if the damping device employs a plurality of series-connected dampers 13, 14 or 113, 114. The springs 55 or 155 of the second damper 14 or 114 are, or can be, relatively short, and the stiffness of springs 55 or 155 can greatly exceed that of the springs 27a, 28a or 127a, 128a.

The initial stressing of the springs 27a, 28a or 127a, 128a can be small or negligible. In addition, the stressing of these relatively long springs need not be very pronounced even when the apparatus 1 or 101 is in actual use, i.e., when the flywheels 3, 4 or 103, 104 are caused to turn relative to each other. Stresses upon the springs 27a, 28a or 127a, 128a can be reduced still further by selecting their positions in such a way that the radii of the springs 27a match or closely approximate the radii of the springs 28a and that the radius of the spring 127a matches or closely approximates that of the spring 128b. Moreover, it is desirable and advantageous to impart to each of the springs 27a, 28a, 127a, 128a an arcuate shape prior to installation in the respective chamber, i.e., to conform in advance the curvature of the coil springs forming part of the damper 13 or 113 to that of the respective portions of the annular chamber in the flywheel 3 or 103.

A further important advantage of the improved apparatus is that the weight of the springs 27a, 28a and 127a, 128a can be but a fraction of the weight of springs which are used in conventional apparatus. This is due to the fact that the springs 27a are adjacent the springs 28a in the axial direction of the flywheel 3 and that the springs 127a are adjacent the springs 128a in the axial direction of the flywheel 103. The advantages of such mounting will be readily appreciated since, in a conventional vibration damping apparatus, a single coil spring must perform the functions of two springs 27a, 28a or 127a, 128a. Relatively small and lightweight coil springs are desirable and advantageous because, when they are acted upon by centrifugal force, such springs are not likely to cause extensive wear upon the respective flywheel 3 or 103, upon the respective inserts 33, 34 or upon the internal surfaces of the sections 22, 23 or 122, 123. Moreover, centrifugal force will entail less pronounced wear upon the lightweight springs 27a, 28a or 127a, 128a. In other words, the utilization of lightweight springs as energy storing means of the damper 13 or 113 contributes to longer useful life of such energy storing means as well as to longer useful life of the entire damper and of the entire vibration damping apparatus.

The improved apparatus are susceptible of many additional modifications without departing from the spirit of the invention. All that counts is to provide the apparatus with a damper which operates between the input and output members (e.g., flywheels) of the apparatus and employs energy storing means having at least two springs (such as 127a, 128a) which operate in parallel and are adjacent each other in the axial direction of the input and output members. The springs undergo deformation to store energy (or to store additional energy) in response to angular displacement of the input and output members relative to each other whereby the springs react against stop means provided (directly or indirectly) on one of the input and output members and bear against stop means which are provided (directly or indirectly) on the other of the input and output members, the stop means on the one member being angularly offset with reference to the stop means on the other member.

It has been found that the improved vibration damping apparatus can be used with particular advantage between an engine and a hydrodynamic torque converter.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. Apparatus for damping vibrations between an engine and a power train, comprising a plurality of flywheels including a first flywheel having first stops and an annular chamber and being connectable with the engine, and a second flywheel rotatable relative to said first flywheel and connectable with the power train by way of a clutch; and a damping device operating between said first and second flywheels and including energy storing means provided in said chamber and an output element having second stops and arranged to transmit torque to said second flywheel, said output element extending into said chamber substantially radially of said first flywheel and said energy storing means comprising at least one first and at least one second spring, said first and second springs being adjacent each other in the axial direction of said first flywheel and being angularly offset relative to each other in the circumferential direction of said first flywheel, said springs reacting against said first stops and bearing against said second stops and the stops for said at least one first spring being angularly offset relative to the stops for said at least one second spring in the circumferential direction of said first flywheel, the angular offset of said at least one first spring and said at least one second spring being such that the stressing of said springs between said first and second stops as a result of angular displacement of said first and second flywheels does not entail appreciable unbalancing of the apparatus.

2. The apparatus of claim 1, wherein said output element comprises a flange.

3. The apparatus of claim 1, wherein said at least one first spring operates in parallel with said at least one second spring.

4. The apparatus of claim 1, wherein said energy storing means comprises a set of first springs and a set of second springs.

5. The apparatus of claim 4, wherein each of said sets comprises fewer than five springs.

6. The apparatus of claim 1, further comprising antifriction bearing means interposed between said first and second flywheels, said bearing mans including at least one annulus of rolling elements.

7. The apparatus of claim 1, wherein said springs are disposed substantially at the same radial distance from the axis of said first flywheel.

8. The apparatus of claim 1, wherein said energy storing means extends along an arc of substantially 360° in the circumferential direction of said first flywheel.

9. The apparatus of claim 1, wherein said energy storing means extends along an arc of 252° to 346° in the circumferential direction of said first flywheel.

10. The apparatus of claim 1, wherein said output element comprises a one-piece flange having a periphery provided with said second stops.

11. The apparatus of claim 1, wherein said first flywheel has first and second sections which define said chamber, each of said sections having a groove extending circumferentially of said first flywheel and forming part of said chamber, said springs extending into said grooves and said sections having surfaces bounding said grooves and at least substantially conforming to the outlines of the respective springs.

12. The apparatus of claim 1, wherein said sections include arcuate portions which define said grooves.

13. The apparatus of claim 1, wherein said energy storing means comprises a single first spring and a single second spring, each of said first stops being disposed substantially diametrically opposite one of said second stops.

14. The apparatus of claim 1, wherein said first flywheel comprises two dished sections which define said chamber.

15. The apparatus of claim 14, wherein said sections have stops and said springs react against said stops.

16. The apparatus of claim 15, wherein said stops have pockets for portions of the respective springs.

17. The apparatus of claim 14, wherein said first stops include projections secured to said sections.

18. The apparatus of claim 17, wherein each of said projections comprises a first portion extending radially of said first flywheel and at least one second portion extending circumferentially of said first flywheel, said springs reacting against the first portions of the respective projections.

19. The apparatus of claim 18, wherein each of said circumferentially extending second portions is adjacent one of said springs and constitutes an abutment which holds the corresponding spring against movement relative to said first flywheel in at least one of the directions radially inwardly and outwardly of the first flywheel.

20. The apparatus of claim 17, further comprising means for bonding said stops to the respective sections of said first flywheel.

21. The apparatus of claim 1, wherein said first flywheel has a group of first stops for said springs and said output element has a group of second stops for said springs, the stops of one of said groups having recesses extending in the circumferential direction of said first flywheel and each stop of the other of said groups extending into one of said recesses.

22. The apparatus of claim 21, wherein said recesses are provided in said first stops and each of said first stops includes a first portion and a second portion disposed outwardly of the respective first portion in the radial direction of said first flywheel, said recesses being disposed between the first and second portions of the respective first stops.

23. The apparatus of claim 22, wherein said second stops extend in substantial parallelism with the axis of said first flywheel.

24. The apparatus of claim 22, wherein the first portion of each first stop includes a projection which is secured to said first flywheel and the second portion of each first stop comprises a pocket for a portion of the respective spring.

25. The apparatus of claim 1, further comprising a first wear-resistant insert for said at least one first spring and a second wear-resistant insert for said at least one second spring, said inserts being disposed in said chamber substantially radially outwardly of the respective springs and further comprising a mounting member for said inserts.

26. The apparatus of claim 1, wherein said damping device includes additional energy storing means disposed radially inwardly of said springs.

27. The apparatus of claim 26, wherein said additional energy storing means is disposed at least substantially midway between said at least one first spring and said at least one second spring in the axial direction of said first flywheel.

28. The apparatus of claim 26, wherein said additional energy storing means comprises at least one additional spring, said second stops defining compartments extending substantially circumferentially of said first flywheel and receiving portions of said first and second springs and said output element having at least one window for said at least one additional spring.

29. The apparatus of claim 26, wherein said springs operate in series with said additional energy storing means.

30. The apparatus of claim 26, wherein said damping device further comprises two discs flanking said output element and having means for receiving portions of said additional energy storing means, said discs being arranged to transmit torque from said output element to said second flywheel by way of said additional energy storing means and said output element having means for connecting said springs in series with said additional energy storing means.

31. The apparatus of claim 30, wherein said receiving means comprises stampings for said additional energy means, said stampings forming part of said discs.

32. The apparatus of claim 1, wherein said damping device further comprises friction generating means between said first and second flywheels.

33. The apparatus of claim 32, wherein said friction generating means includes means for opposing certain angular movements of said first and second flywheels relative to each other.

34. The apparatus of claim 32, wherein said damping device further comprises two discs arranged to transmit torque from said output element to said second flywheel, said friction generating means being disposed between the axis of said first flywheel and said discs.

35. The apparatus of claim 32, wherein said output element has at least one slot and said friction generating means comprises an extension received in said at least one slot with play in the circumferential direction of said first flywheel.

36. Apparatus for damping vibrations in power trains of motor vehicles, including a rotary input member having first stops; an output member having second stops and rotatable relative to said input member; and energy storing means operating between and extending in the circumferential direction of said members, said energy storing means including at least one first spring and at least one second spring, said first and second springs being located substantially at the same radial distance from the axes of said members, being adjacent each other in the axial direction of said members and being offset relative to each other in the circumferential direction of said members, said springs reacting against the stops of one of said members and bearing against the stops of the other of said members, said stops being offset relative to each other in the circumferential direction of said members in such a way that the stressing of said springs by said stops as a result of angular displacement of said members does not entail appreciable unbalancing of the apparatus.

37. Apparatus for damping vibrations between an engine and a power train, comprising a plurality of flywheels including a first flywheel having first stops and an annular chamber and being connectable with the engine, and a second flywheel rotatable relative to said first flywheel and connectable with the power train by way of a clutch; and a damping device operating between said first and second flywheels and including energy storing means provided in said chamber and an output element having second stops arranged to transmit torque to said second flywheel, said output element comprising a one-piece flange having a periphery provided with said second stops, said output element extending into said chamber substantially radially of said first flywheel and said energy storing means comprising at least one first and at least one second spring, said first and second springs being adjacent each other in the radial and axial directions of said first flywheel and being angularly offset relative to each other in the circumferential direction of said first flywheel, said springs reacting against said first stops and bearing against said second stops and the stop for said at least one first spring being angularly offset relative to the stop for said at least one second spring in the circumferential direction of said first flywheel, the angular offset of said at least one first spring and said at least one second spring being such that the stressing of said springs between said first and second stops as a result of angular displacement of said first and second flywheels does not entail appreciable unbalancing of the apparatus, said second stops extending in substantial parallelism with the axis of said first flywheel and including at least one first stop element for said at least one first spring and at least one second stop element for said at least one second spring, said at least one first stop element extending in a first direction and said at least one second stop element extending in a second direction substantially counter to said first direction.

38. The apparatus of claim 37, wherein said flange comprises at least two first stop elements and said at least one second stop element is located between said at least two first stop elements in the circumferential direction of said first flywheel.

39. Apparatus for damping vibrations between an engine and a power train, comprising a plurality of flywheels including a first flywheel having an annular chamber and being connectable with the engine, and a second flywheel rotatable relative to said first flywheel and connectable with the power train by way of a clutch; a damping device operating between said first and second flywheels and including energy storing means provided in said chamber and an output element arranged to transmit torque to said second flywheel, said energy storing means reacting against said first flywheel and bearing against said output element, said output element extending in said chamber substantially radially of said first flywheel and said energy storing means comprising at least one first and at least one second spring, said first and second springs being adjacent each other in the axial direction of said first wheel and being angularly offset relative to each other in the circumferential direction of said first flywheel; a first wear-resistant insert for said at least one second spring, said inserts being disposed in said chamber substantially radially outwardly of the respective springs; and a mounting member for said inserts, said mounting member comprising at least one ring which is installed in said chamber between said inserts.

40. The apparatus of claim 39, wherein said first flywheel has an internal surface radially outwardly of said chamber and said surface has a groove for a portion of said ring.

41. The apparatus of claim 39, wherein said at least one ring has a substantially circular cross-sectional outline.

* * * * *